US010912306B2

(12) United States Patent
De Luca et al.

(10) Patent No.: US 10,912,306 B2
(45) Date of Patent: Feb. 9, 2021

(54) CONTINUOUS RENEWAL SYSTEM FOR A WIRE MESH HEATING ELEMENT AND A WOVEN ANGLED WIRE MESH

(71) Applicants: De Luca Oven Technologies, LLC, San Francisco, CA (US); Nicholas P. De Luca, Carmel-by-the-Sea, CA (US); Andrew Perkins, Berkeley, CA (US)

(72) Inventors: Nicholas P. De Luca, Carmel-by-the-Sea, CA (US); Andrew Perkins, Berkeley, CA (US)

(73) Assignee: De Luca Oven Technologies, LLC, San Francisco, CA (US)

(*) Notice: Subject to any disclaimer, the term of this patent is extended or adjusted under 35 U.S.C. 154(b) by 894 days.

(21) Appl. No.: 15/183,967

(22) PCT Filed: Dec. 16, 2014

(86) PCT No.: PCT/US2014/070601
§ 371 (c)(1),
(2) Date: Jul. 8, 2016

(87) PCT Pub. No.: WO2015/095191
PCT Pub. Date: Jun. 25, 2015

(65) Prior Publication Data
US 2016/0345591 A1    Dec. 1, 2016

Related U.S. Application Data

(60) Provisional application No. 62/000,598, filed on May 20, 2014, provisional application No. 61/916,705, filed on Dec. 16, 2013.

(51) Int. Cl.
*A21B 1/22* (2006.01)
*H05B 3/06* (2006.01)
(Continued)

(52) U.S. Cl.
CPC ............. *A21B 1/22* (2013.01); *A21B 1/48* (2013.01); *A47J 37/044* (2013.01); *H05B 3/06* (2013.01);
(Continued)

(58) Field of Classification Search
CPC . A21B 1/22; A21B 1/48; A47J 37/044; H05B 3/06; H05B 3/34; H05B 2203/007;
(Continued)

(56) References Cited

U.S. PATENT DOCUMENTS 5,909,533 A   6/1999 Kitabayashi et al.
5,958,271 A   9/1999 Westerberg et al.
(Continued)

FOREIGN PATENT DOCUMENTS

CN    201533563 U    7/2010
EP    1274281 A2     1/2003
(Continued)

OTHER PUBLICATIONS

International Search Report for corresponding PCT Application PCT/US2014/070601 dated Mar. 20, 2015.

*Primary Examiner* — Shawntina T Fuqua
(74) *Attorney, Agent, or Firm* — Capitol City TechLaw, PLLC; Jasbir Singh

(57) ABSTRACT

Disclosed is a mesh heating system including: two or more electrodes configured to supply a current to the wire mesh heating element; a mesh heating element comprising filaments disposed between the two or more electrodes; and a tensioner to maintain the wire mesh heating element at tension along an axis of tension as the wire mesh heating element is heated, wherein some of the filaments of the mesh heating element are disposed to intersect the axis of tension at a non-orthogonal angle.

18 Claims, 15 Drawing Sheets

(51) Int. Cl.
*H05B 3/34* (2006.01)
*A21B 1/48* (2006.01)
*A47J 37/04* (2006.01)

(52) U.S. Cl.
CPC ......... *H05B 3/34* (2013.01); *H05B 2203/007* (2013.01); *H05B 2203/011* (2013.01); *H05B 2203/014* (2013.01)

(58) Field of Classification Search
CPC ........ H05B 2203/011; H05B 2203/014; H05B 3/36; H05B 3/342; H05B 3/345; H05B 3/347; H05B 3/12; H05B 2203/017; H05B 2203/029; H05B 2203/035; H05B 2203/036; H05B 2203/015; H05B 2203/016; H05B 2203/032; H05B 1/0227
See application file for complete search history.

(56) References Cited

U.S. PATENT DOCUMENTS

| | | | |
|---|---|---|---|
| 6,069,345 A | 5/2000 | Westerberg | |
| 6,114,666 A | 9/2000 | Best | |
| 6,146,677 A | 11/2000 | Moreth | |
| 6,172,344 B1 * | 1/2001 | Gordon | H05B 3/34 219/497 |
| 6,242,716 B1 * | 6/2001 | Wang | A47J 37/0623 219/404 |
| 6,348,676 B2 | 2/2002 | Kim et al. | |
| 6,369,360 B1 | 4/2002 | Cook | |
| 6,417,494 B1 | 7/2002 | Westerberg et al. | |
| 6,575,154 B1 | 6/2003 | Freeman et al. | |
| 6,864,464 B2 * | 3/2005 | McWilliams | F24C 7/06 219/391 |
| 6,867,392 B1 | 3/2005 | Howard | |
| 6,946,631 B2 | 9/2005 | Braunisch et al. | |
| 7,091,452 B2 | 8/2006 | Kingdon et al. | |
| 7,105,779 B2 | 9/2006 | Shei | |
| 7,129,449 B2 | 10/2006 | Tominaga et al. | |
| 7,196,291 B2 | 3/2007 | Cothran | |
| 7,231,871 B1 | 6/2007 | Wilbers | |
| 7,297,903 B1 | 11/2007 | March et al. | |
| 7,307,243 B2 | 12/2007 | Farkas et al. | |
| 7,335,858 B2 | 2/2008 | Cavada et al. | |
| 7,424,848 B2 | 9/2008 | Jones et al. | |
| 7,619,186 B2 | 11/2009 | Cavada et al. | |
| 7,717,704 B2 | 5/2010 | Burtea et al. | |
| 7,726,967 B2 | 6/2010 | Best | |
| 7,800,023 B2 | 9/2010 | Burtea et al. | |
| 7,851,727 B2 | 12/2010 | Burtea et al. | |
| 7,886,658 B2 | 2/2011 | McFadden et al. | |
| 8,033,213 B2 | 10/2011 | Cook et al. | |
| 8,089,434 B2 * | 1/2012 | Moore | B82Y 20/00 313/582 |
| 8,126,319 B2 | 2/2012 | De Luca | |
| 8,145,548 B2 | 3/2012 | De Luca | |
| 8,272,320 B2 | 9/2012 | Baker et al. | |
| 8,350,197 B2 | 1/2013 | Tominaga et al. | |
| 8,498,526 B2 * | 7/2013 | De Luca | H05B 3/0076 392/416 |
| 8,522,675 B2 | 9/2013 | Veltrop | |
| 8,529,746 B2 * | 9/2013 | Grant | H01G 9/042 205/108 |
| 8,563,900 B2 | 10/2013 | Han | |
| 8,637,792 B2 | 1/2014 | Agnello et al. | |
| 8,731,385 B2 | 5/2014 | De Luca | |
| 8,770,181 B2 | 7/2014 | Best | |
| 8,929,724 B1 | 1/2015 | Mograbi | |
| 8,948,579 B2 | 2/2015 | Lee | |
| 8,954,351 B2 | 2/2015 | De Luca | |
| 8,991,386 B2 | 3/2015 | Ahmed | |
| 8,993,026 B2 | 3/2015 | Molnar et al. | |
| 9,089,241 B2 | 7/2015 | Zoucha | |
| 9,161,547 B2 | 10/2015 | McKee | |
| 9,332,877 B2 | 5/2016 | Cochran et al. | |
| 9,414,443 B2 | 8/2016 | Fujinami et al. | |
| 9,414,707 B2 | 8/2016 | Coleman | |
| 2003/0024096 A1 * | 2/2003 | Auf Der Maur | B65H 29/006 29/423 |
| 2004/0045950 A1 * | 3/2004 | Balandier | F24C 7/06 219/404 |
| 2010/0166397 A1 | 7/2010 | De Luca | |
| 2011/0210115 A1 | 9/2011 | Lauer | |
| 2012/0294595 A1 | 11/2012 | Veltrop et al. | |
| 2013/0105470 A1 | 5/2013 | De Luca et al. | |
| 2013/0161315 A1 | 6/2013 | Cowan | |
| 2014/0080079 A1 | 3/2014 | Luo et al. | |
| 2014/0110390 A1 | 4/2014 | Wu et al. | |
| 2014/0199446 A1 | 7/2014 | Huegerich | |
| 2014/0216434 A1 | 8/2014 | Moreth et al. | |
| 2014/0318382 A1 | 10/2014 | Hornbeck et al. | |
| 2015/0230295 A1 | 8/2015 | Morassut et al. | |
| 2015/0245623 A1 | 9/2015 | Schjerven et al. | |
| 2016/0174768 A1 | 6/2016 | DeVerse | |
| 2016/0227964 A1 | 8/2016 | Zutphen et al. | |
| 2016/0327278 A1 | 11/2016 | McKee et al. | |

FOREIGN PATENT DOCUMENTS

| | | |
|---|---|---|
| EP | 1604547 B1 | 12/2011 |
| EP | 2221782 B1 | 12/2011 |
| EP | 2374385 B1 | 5/2013 |
| JP | H08-215067 | 8/1996 |
| JP | 2001026877 | 1/2000 |
| JP | 2002069647 A | 3/2002 |
| JP | 2004172269 A | 6/2004 |
| WO | 2015050329 A1 | 4/2015 |
| WO | 2016114451 A1 | 7/2016 |
| WO | 2016194406 A1 | 12/2016 |
| WO | 2017000303 A1 | 1/2017 |

\* cited by examiner

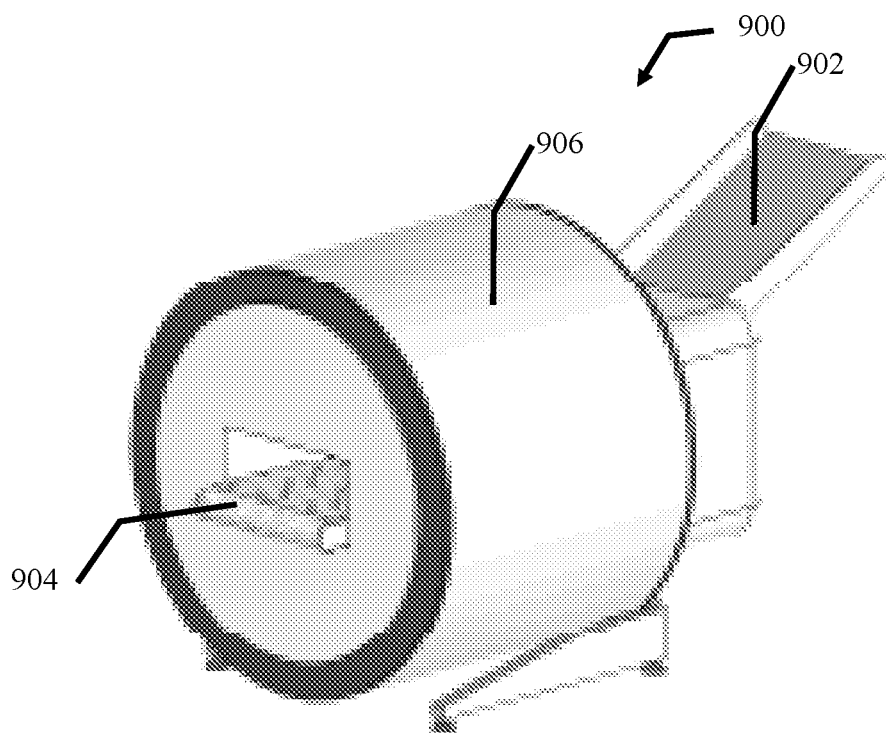
FIG. 9A
FIG. 9B
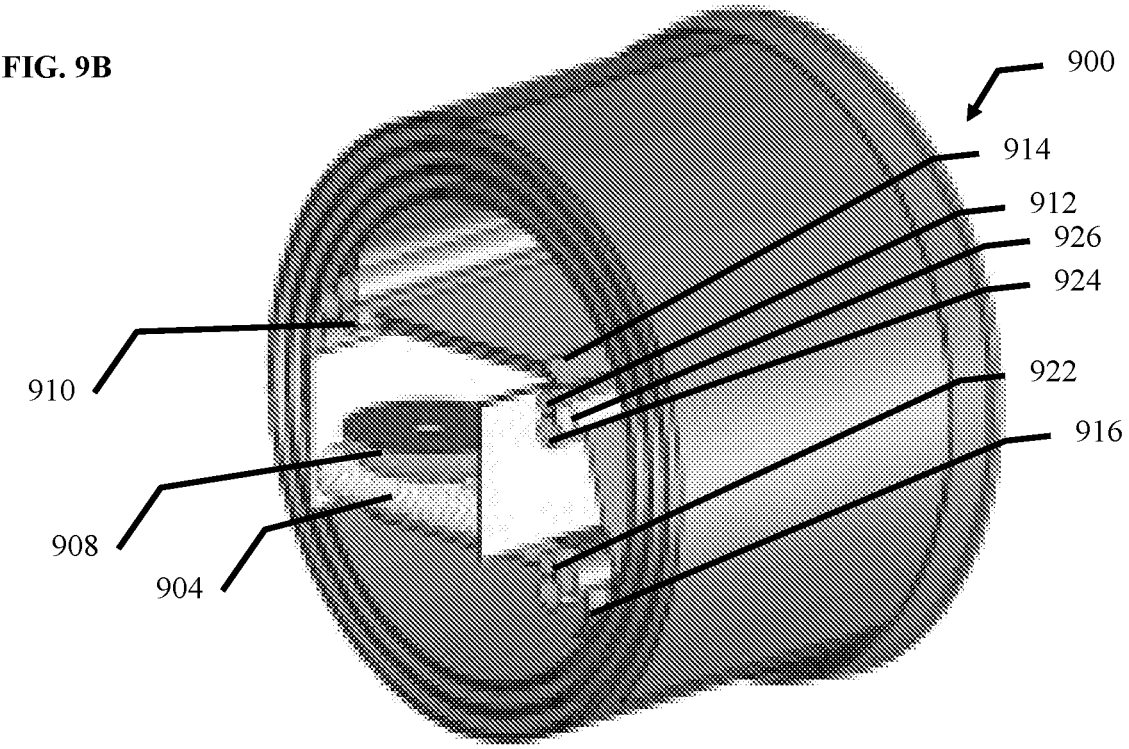

CONTINUOUS RENEWAL SYSTEM FOR A WIRE MESH HEATING ELEMENT AND A WOVEN ANGLED WIRE MESH

CROSS REFERENCE TO RELATED APPLICATIONS

The present application is a 371 of International Patent Application No. PCT/US2014/070601 filed Dec. 16, 2014, which claims the benefit of US Provisional Application No. 61/916,705, filed Dec. 16, 2013 and U.S. Provisional Application No. 62/000,598, filed May 20, 2014, all of which are incorporated in their entirety by reference for all purposes as if fully set forth herein.

BACKGROUND

Aspects of the mobile apparatus may be found in U.S. Pat. Nos. 8,126,319, 8,145,548, 8,498,526, 8,731,385, and 8,954,351, and US Patent Publication No. 2013-0105470, all of which are incorporated in their entirety by reference for all purposes as if fully set forth herein.

In performing life cycle testing though it has been determined that mesh typically lasts 300-500 on cycles and for a cooking recipe requiring multiple on-off cycles this number is further reduced by one-thirds (⅓). The failure appears related to the application of tension in the same direction as the strands of the mesh that can lead to elongation and fracturing of the mesh. The failure of the mesh may be due to individual strands heating up at slightly different rates, and/or the force or tension being concentrated on a single strand. Typically the tension can be on the order of 5-50 g/mm for the mesh.

FIG. 1A and FIG. 1B are photographs illustrating a prior art mesh heating element after failure where the prior art mesh heating element fails by ripping or tearing, for example, along strands, along tension force lines, along hot spots in the wire mesh.

SUMMARY

The present teachings provide embodiments of automated product storage, heating and dispensation system and methods, and features thereof, which offer various benefits. The system can employ multiple and integrated activation, enabling, and disabling of safety mechanisms, systems, operations, and the like to promote safe, efficient, and effective use of the devices and methods disclosed herein.

It is to be understood that both the foregoing general description and the following detailed description are exemplary and explanatory and are intended to provide further explanation of the invention as claimed.

BRIEF DESCRIPTION OF THE FIGURES

The accompanying drawings, which are included to provide a further understanding of the invention and are incorporated in and constitute a part of this specification, illustrate embodiments of the invention, and together with the description serve to explain the principles of the invention.

FIG. 9A illustrates a perspective view of a continuous wire mesh heating system according to exemplary embodiments.

FIG. 9B illustrates a perspective view of a continuous wire mesh heating system of FIG. 9A without a cover, according to exemplary embodiments.

Figure 1A:
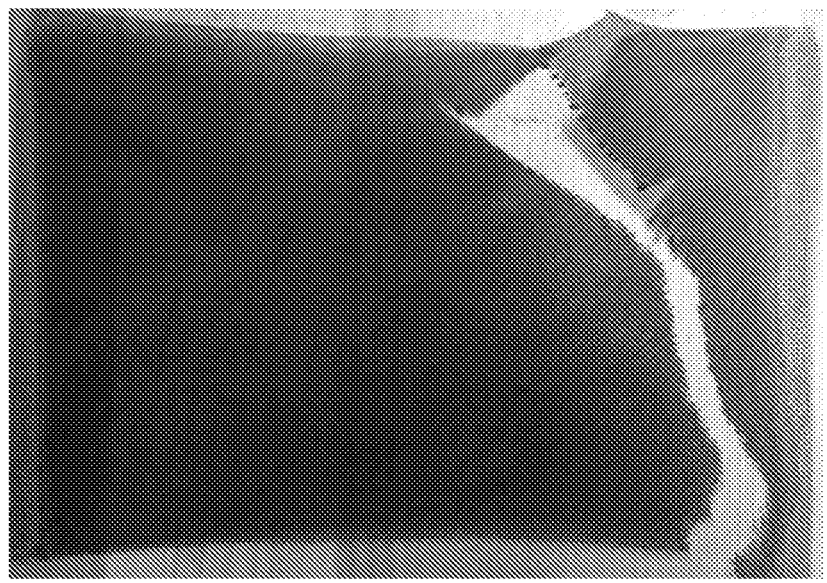
FIG. 1A and FIG. 1B are photographs illustrating a prior art mesh heating element after failure.

Throughout the drawings and the detailed description, unless otherwise described, the same drawing reference numerals will be understood to refer to the same elements, features, and structures. The relative size and depiction of these elements may be exaggerated for clarity, illustration, and convenience.

DESCRIPTION OF PREFERRED EMBODIMENT(S)

Exemplary embodiments will now be described more fully hereinafter with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete, and will fully convey the scope of this disclosure to those skilled in the art. Various changes, modifications, and equivalents of the systems, apparatuses, and/or methods described herein will likely suggest themselves to those of ordinary skill in the art. Elements, features, and structures are denoted by the same reference numerals throughout the drawings and the detailed description, and the size and proportions of some elements may be exaggerated in the drawings for clarity and convenience.

Additional features of the invention will be set forth in the description which follows, and in part will be apparent from the description, or may be learned by practice of the invention.

A mesh heating element capable of withstanding high cycling rates at high temperatures and may be tensioned in a planar direction is disclosed. A high speed cooking unit, including, for example, toasting, capable of extended cycling times beyond the normal life expectancy is also disclosed.

Figure 2:
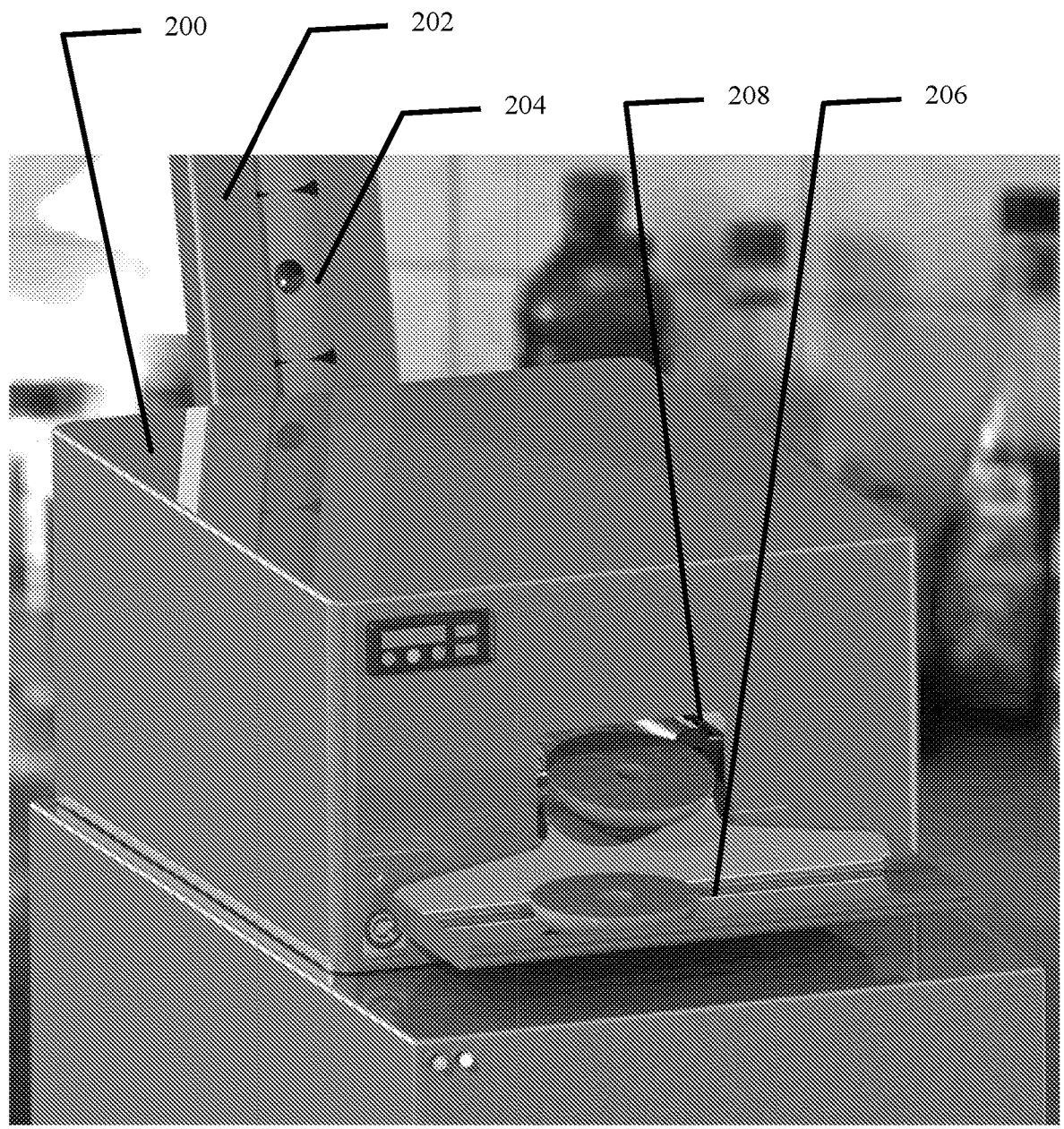
FIG. 2 illustrates an oven including a heating system according to exemplary embodiments.

FIG. 2 illustrates an oven 200 according to exemplary embodiments. The oven 200 may include or be connected to an input chute 202 to deliver or provide a food item or load 204 to a heating cavity 208 of the oven 200. The input chute 202 may be passive and operate using gravity to feed the food item or load to the heating cavity 208. In some embodiments, the input chute 202 can be a non-passive and operate using an automated or semi-automated mechanized device to feed the food item or load to the heating cavity 208. The oven 200 may include or be connected to an output chute 206 to receive the food item or load 204 after being heated in the heating cavity 208 of the oven 200. The output chute 206 may be passive and operate using gravity to receive the food item or load from the heating cavity 208. In some embodiments, the output chute 206 may be a non-passive and operate using an automated or semi-automated mechanized device to receive the food item or load from the heating cavity 208.

In exemplary embodiments, the food item or load 204 may be a baked food item that needs to be toasted, for example, a bagel, toast, English muffin or the like. In exemplary embodiments, the food item or load 204 may be a meat product that needs to be heated and seared, for example, a sausage, a hamburger patty, bacon or the like.

Figure 3C:
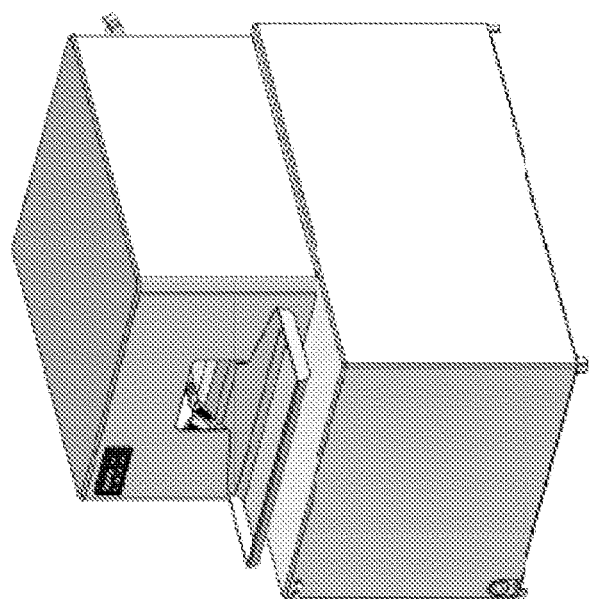
FIG. 3C illustrates a perspective view of an oven including a heating system according to exemplary embodiments.
Figure 3B:
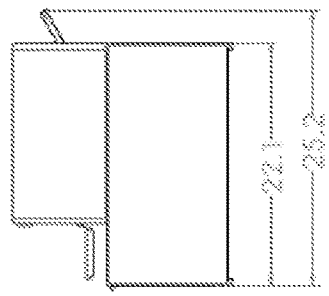
FIG. 3B illustrates a side view of an oven including a heating system according to exemplary embodiments.
Figure 3A:
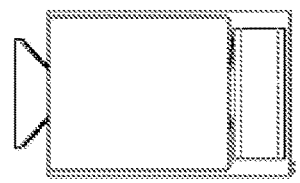
FIG. 3A illustrates a front view and a back view of an oven including a heating system according to exemplary embodiments.

FIG. 3A illustrates a front view and a back view of an oven including a heating system according to exemplary embodiments. Some exemplary external dimensions of the oven are illustrated in FIG. 3A.

FIG. 3B illustrates a side view of an oven including a heating system according to exemplary embodiments. Some exemplary external dimensions of the oven are illustrated in FIG. 3B.

FIG. 3C illustrates a perspective view of an oven including a heating system according to exemplary embodiments.

Figure 4C:
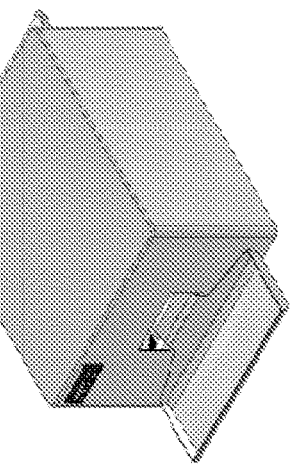
FIG. 4C illustrates a perspective view an oven according to exemplary embodiments.
Figure 4B:
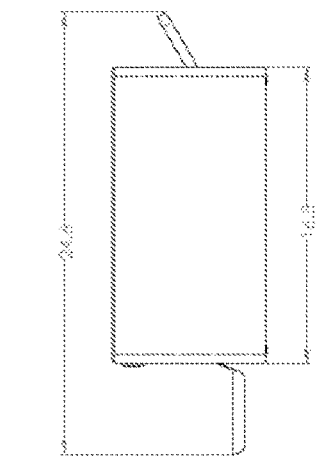
FIG. 4B illustrates a side view an oven according to exemplary embodiments.
Figure 4A:
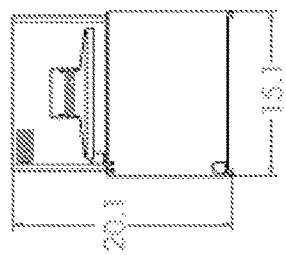
FIG. 4A illustrates a front view and a back view of an oven according to exemplary embodiments.

FIG. 4A illustrates a front view and a back view of an oven according to exemplary embodiments. Some exemplary external dimensions of the oven are illustrated in FIG. 4A.

FIG. 4B illustrates a side view an oven according to exemplary embodiments. Some exemplary external dimensions of the oven are illustrated in FIG. 4B.

FIG. 4C illustrates a perspective view an oven according to exemplary embodiments.

In exemplary embodiments, a tension can be applied across the width of the mesh heating element so that as the mesh heats, the mesh maintains a generally flat format so as to radiate energy normal to the element.

A mesh heating element can heat to 1500 degrees F. or so by applying a Direct Current (DC) voltage over a length of the mesh. In exemplary embodiments, for example, the DC source can be applied across a shorter length of a mesh heating element shaped as a rectangle. In exemplary embodiments, for example, the DC source can be applied across a longer length of a mesh heating element shaped as a rectangle. The 1500 degrees F. can be attained, for example, in less than within 1-2 seconds. The DC voltage source can provide a DC voltage of 12V, 24V, 36V, 48V, 60V or the like. The DC voltage source can include batteries. The DC voltage source can include a rectifier or the like powered by an AC power source.

In exemplary embodiments, a mesh may be formed using a material made from filaments including threads or wires with evenly spaced holes that allow air or water to pass through. A mesh gauge can provide the number of openings per inch in the mesh. Exemplary mesh gauges suitable for use a mesh heating element may include a 10 gauge mesh, a 20 gauge mesh, a 30 gauge, a 40 gauge mesh, a 50 gauge mesh, or the like. Exemplary mesh gauges to be utilized in a high-disclosed can be determined by using the DeLuca ratio.

In exemplary embodiments, a mesh heating element can be generally made using nichrome wire with small mesh gauges, for example, a gauge of 20 or 40. An element suitable for heating materials, for example, food products, such as toast, muffins, bagels, bread products, or the like, can utilize an element about that is about 40 square inches. For example, the element can be shaped as a rectangle that is approximately 8.5"×5".

In exemplary embodiments, a mesh heating element can be formed using a square mesh. In exemplary embodiments, a mesh heating element can be formed using a diamond mesh, a round mesh, or the like.

The filaments of the mesh can be formed with one or more wires. In some embodiments, the mesh can be formed using one or more threads.

Figure 1B:
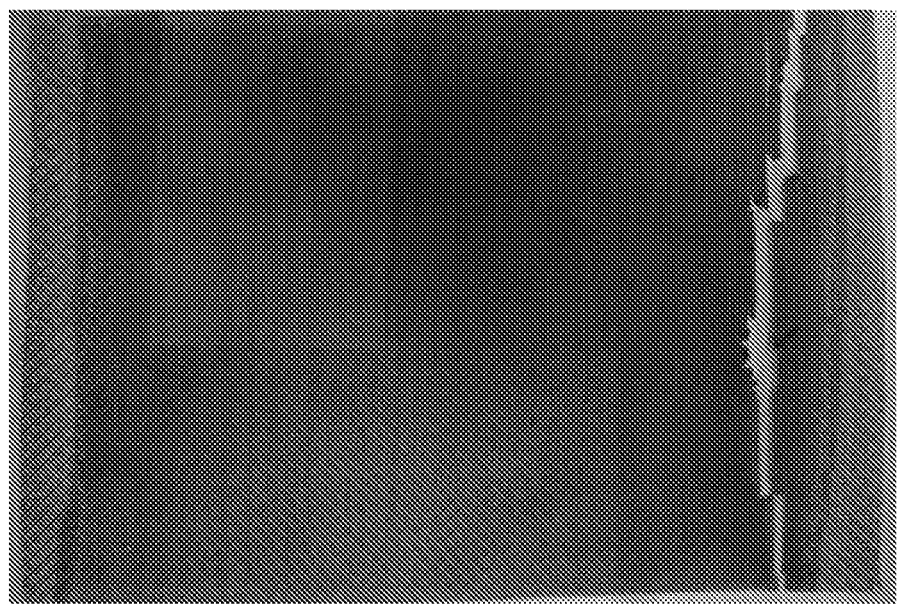

In exemplary embodiments, cross or diagonal wires disposed in electrical contact with a mesh heating element can promote a heating of the mesh heating element from the inside to outside. In prior art, without the cross or diagonal wires a mesh heating element would heat from the inside to the outside and as seen in the FIG. 1A and FIG. 1B, the mesh heating element would expand along an axis of tension and tear. A mesh heating element expands rapidly as it is heated. Intersections of filaments get hotter than non-intersected portions of the filament. As the mesh heating filament, for example, a Ni-Chrome heating element is heating to about 1500° F. and the melting point of Ni-Chrome is about 1800° F., the hotter intersections can melt along the axis of tension.

In exemplary embodiments, the tensioner can include a spring. For a planar shaped mesh heating element the tensioner may include one or more springs attached to a fixed support at one end and a pivoting independently suspended conductor bar affixed to one edge of the mesh heating element.

Figure 5A:
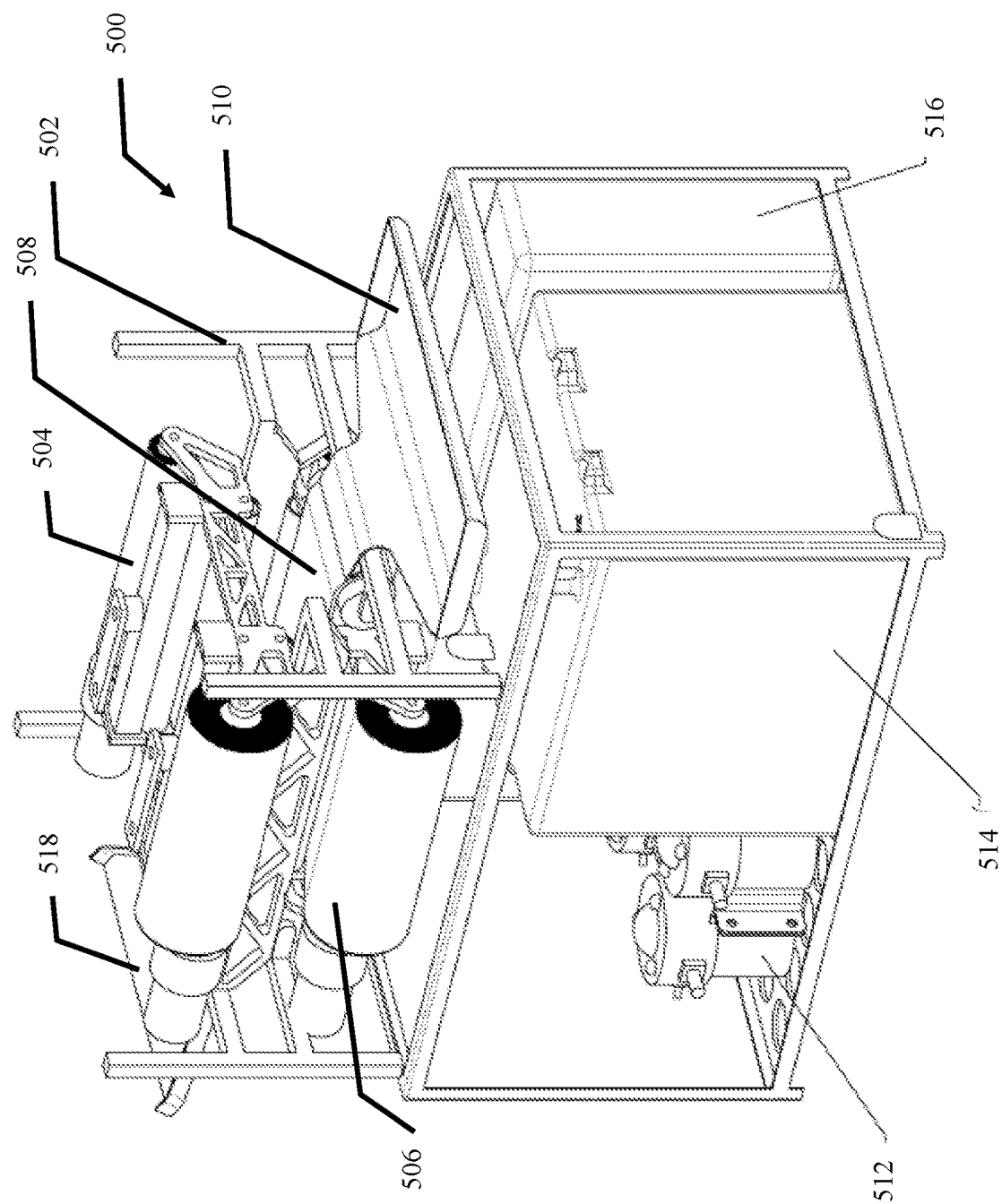
FIG. 5A illustrates a heating system without a housing cover according to exemplary embodiments.

FIG. 5A illustrates an oven without a housing cover according to exemplary embodiments. An oven 500 may include a chassis or frame 502 to support a continuous mesh heating element assembly 504. In exemplary embodiments, the chassis or frame 502 may support multiple continuous mesh heating element assemblies. For example, the chassis or frame 502 may support the continuous mesh heating element assembly 504 and a continuous mesh heating element assembly 506. A drive belt 508 is disposed adjacent to the wire mesh heating system 504. The drive belt 508 may include a wire open cell belt and may move items to be heated between the continuous mesh heating element assembly 504 and a continuous mesh heating element assembly 506. In exemplary embodiments, the drive belt 508 is disposed adjacent to and between the continuous mesh heating element assembly 504 and the continuous mesh heating element assembly 506. The oven 500 may include or be connected to an output chute 510 to receive the food item or load 204 after being heated in the oven 500.

The oven 500 may include a relay 512 to switch the electrical current used to energize the continuous mesh heating element assembly 504 and the continuous mesh heating element assembly 506. The oven 500 may include a battery 514 to provide or supplement the electrical current used to energize the continuous mesh heating element assembly 504 and the continuous mesh heating element assembly 506. The oven 500 may include a charger 516 to charge the battery 512, as necessary.

Figure 5B:
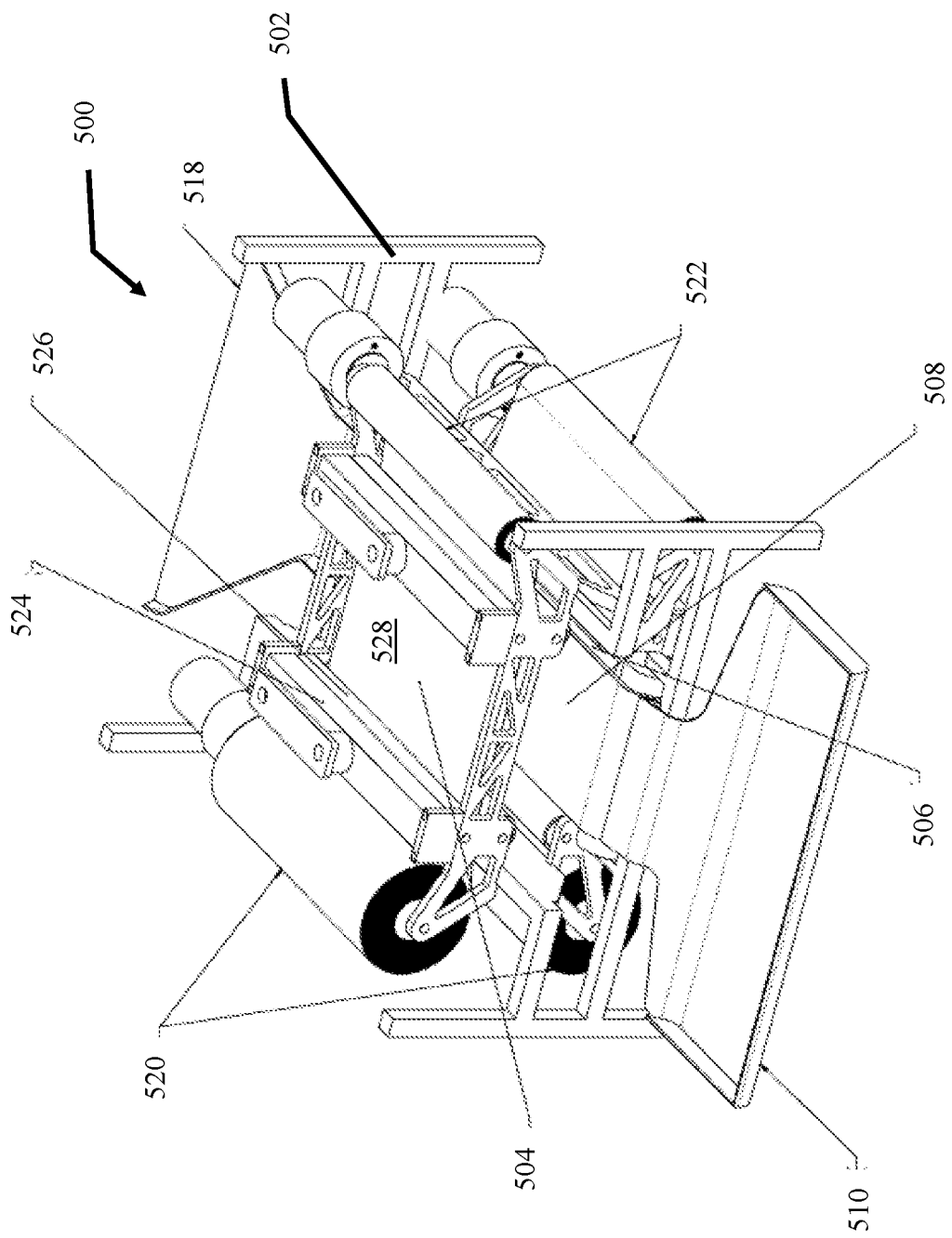
FIG. 5B illustrates a portion of the oven of FIG. 5A without a housing cover according to exemplary embodiments.

FIG. 5B illustrates a portion of the oven 500 of FIG. 5A without a housing cover according to exemplary embodiments. The continuous mesh heating element assembly 504 may include a heat element supply roll 520 to dispense wire mesh as needed. The continuous mesh heating element assembly 504 may include a heat element take-up roll 522 to collect wire mesh that has been used to generate heat in the heating cavity. The continuous mesh heating element assembly 504 may include a pair of electrodes 524 or contact blocks that link the power supply to the wire mesh using contactor rollers 526 disposed in electrical contact with the contact block 524. The contact block 524 may include a brush block to link power from a bus bar 529 through brushes (not shown) to the contactor rollers 526. The contactor rollers 526 ride or contact the wire mesh element. The contactor rollers 526 are electrically isolated from the chassis or frame 502 by using an electrically isolating roll mount 536 (see FIG. 5C).

In exemplary embodiments, the continuous mesh heating element assembly 504 and the continuous mesh heating element assembly 506 each may generate heat only with a portion 528 of their respective continuous wire mesh. In exemplary embodiments, the heat generating portion 528 may have approximate dimensions of 4.5 inches×8 inches. The heat generating portion 528 of the wire mesh may be bounded by the contactor rollers 526.

Figure 5C:
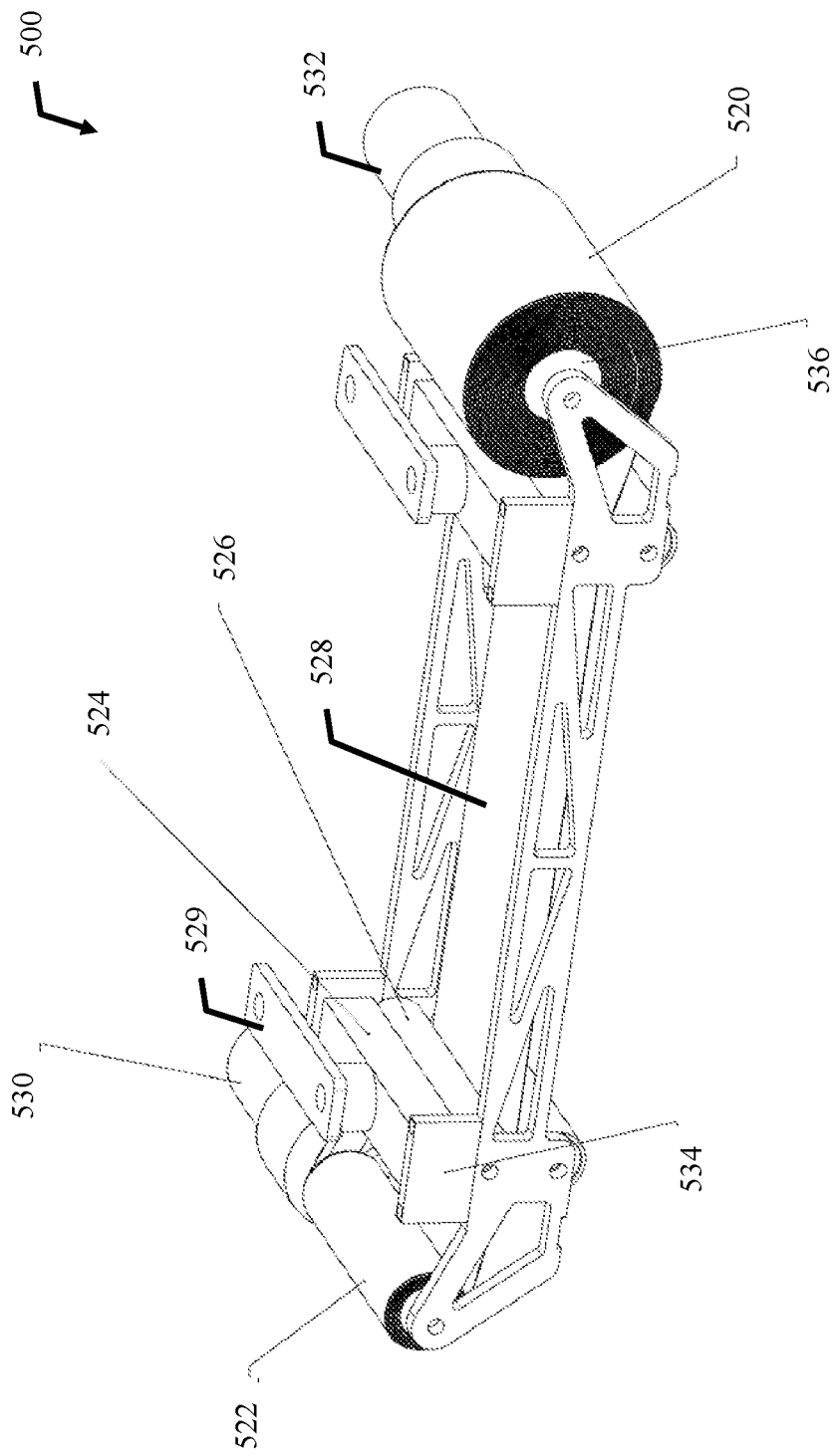
FIG. 5C illustrates a portion of the oven of FIG. 5A without a housing cover according to exemplary embodiments.

FIG. 5C illustrates a portion of the oven 500 of FIG. 5A without a housing cover according to exemplary embodiments. The heat element supply roll 520 may be rotated using a drive motor 530 to keep the heat generating portion 528 of the wire mesh under tension. In exemplary embodiments, the heat generating portion 528 of the wire mesh may be tensioned by using a pre-loaded tensioned spring (not shown) disposed inside the heat element supply roll 520. The heat element take-up roll 522 may be rotated using a drive motor 532 to keep the heat generating portion 528 of the wire mesh under tension. In exemplary embodiments, the heat generating portion 528 of the wire mesh may be tensioned by using a pre-loaded tensioned spring (not shown) disposed inside the heat element take-up roll 522.

In exemplary embodiments, a continuous mesh heating element including one or more angled or diagonal filaments may be disposed on a roller. In the continuous mesh heating element including one or more angled or diagonal filaments only a portion of the mesh heating element is heated. In exemplary embodiments, the continuous mesh heating element may be advanced or indexed as appropriate. For example, a roll of Ni-chrome mesh heating element can be positioned to feed the continuous mesh heating element between two or more electrical contactors, contact rollers, bus bars, roller brushes or contact bars. The continuous mesh heating element may be indexed to maximize continuous operation of the heating system. The indexing of the continuous mesh heating element can ensure that no portion of the mesh heating element is heated more than an expected lifecycle of the continuous mesh heating element.

In exemplary embodiments, the continuous mesh heating element can be manually indexed, for example, using a knob (not shown) disposed outside the heating cavity or a housing wherein the mesh heating element is disposed. In exemplary embodiments, the continuous mesh heating element can be indexed using a step motor or the like.

In exemplary embodiments, a controller can track the number of heating cycles and direct the advance of the continuous mesh heating element as appropriate. In exemplary embodiments, a continuous mesh heating assembly may include automated support to advance or index the continuous mesh heating element. For example, the controller may direct the roller assembly to index the continuous mesh heating element when appropriate. In exemplary embodiments, the controller can notify an operator to advance or index the continuous mesh heating element. In exemplary embodiments, when a controller is not available, an operator of the oven can index the continuous mesh heating element by counting the number of heat cycles.

The indexing can ensure that no portion of the continuous mesh heating element is subjected to more than 10,000 cycles of heating. For example, when provided with a continuous mesh heating element with a projected life of 10,000 cycles, which continuous mesh heating element is to be heated 8 inches at a time could be indexed to advance by 0.0008" per cycle, 0.08" every 100 cycles, or the like. The continuous mesh heating element may, for example, be 5 inches wide and may be heated by a contactor or contact roller that is about width. In exemplary embodiments, the controller can be provided with the lifecycle, a length of the contact bar, an indexing length or step of the roller system, or the like.

In exemplary embodiments, when the wire mesh element includes a continuous mesh heating element spooled on a roller or the like, a spring can be disposed in the mesh heating element supply roller, or may be disposed in the mesh heating element take-up roller to keep the heat-producing portion of the mesh heating element under tension.

In exemplary embodiments, a mesh heating element is disposed, mounted or positioned so that one or more of the filaments included in the mesh heating element are not parallel with an axis of tension within the mesh heating element. The axis of tension may extend between two or more tension points or terminals disposed about the periphery of the mesh heating element. In exemplary embodiments, the tension point or terminal may also be an electrical contact point. In exemplary embodiments, the tension point or terminal may not be an electrical contact point.

In exemplary embodiments, one of the filaments included in the mesh heating element may not extend from one terminal to the other, but rather may extend between orthogonal sides or edges of the mesh heating element. In other words, one of the filaments included in the mesh heating element may be disposed diagonally with respect to filaments forming the mesh heating element. The one or more diagonally disposed filaments can promote a more uniform heating of the mesh heating element.

Without limitation, the one or more diagonally disposed filaments may force the electric current through different filaments through the mesh heating element. In other words, an electrical current may travel in a zigzag path through the mesh heating element, rather than in a linear path when traveling from a first electrical contact point to a second electrical contact. In exemplary embodiments, the first electrical contact point may be in electrical contact with a first edge of the mesh heating element. The second contact point may be in electrical contact with a second edge of the mesh heating element. The first edge in contact with the first electrical contact point may be across or opposite from the second edge in contact second electrical contact point.

In exemplary embodiments, cross filaments within the mesh heating element can extend at a diagonal between opposite electric elements producing warm areas inside the mesh (at the crossing of the filaments) that creates heating first within the center of the mesh heating element. For example, the cycle of a 20 gauge 8.5"×5" wire mesh heating element tensioned at approximately 10 g/mm with a 45 degree offset may yield a lifecycle in excess of 10,000 cycles. The reorientation of the mesh heating element at a 45° offset increases the lifecycle of the same type of mesh heating element that is not offset by an order of magnitude; the non-offset mesh heating element generally has a lifecycle of about 300-500 cycles as compared to 10,000 cycles for an offset mesh heating element.

Figure 6:
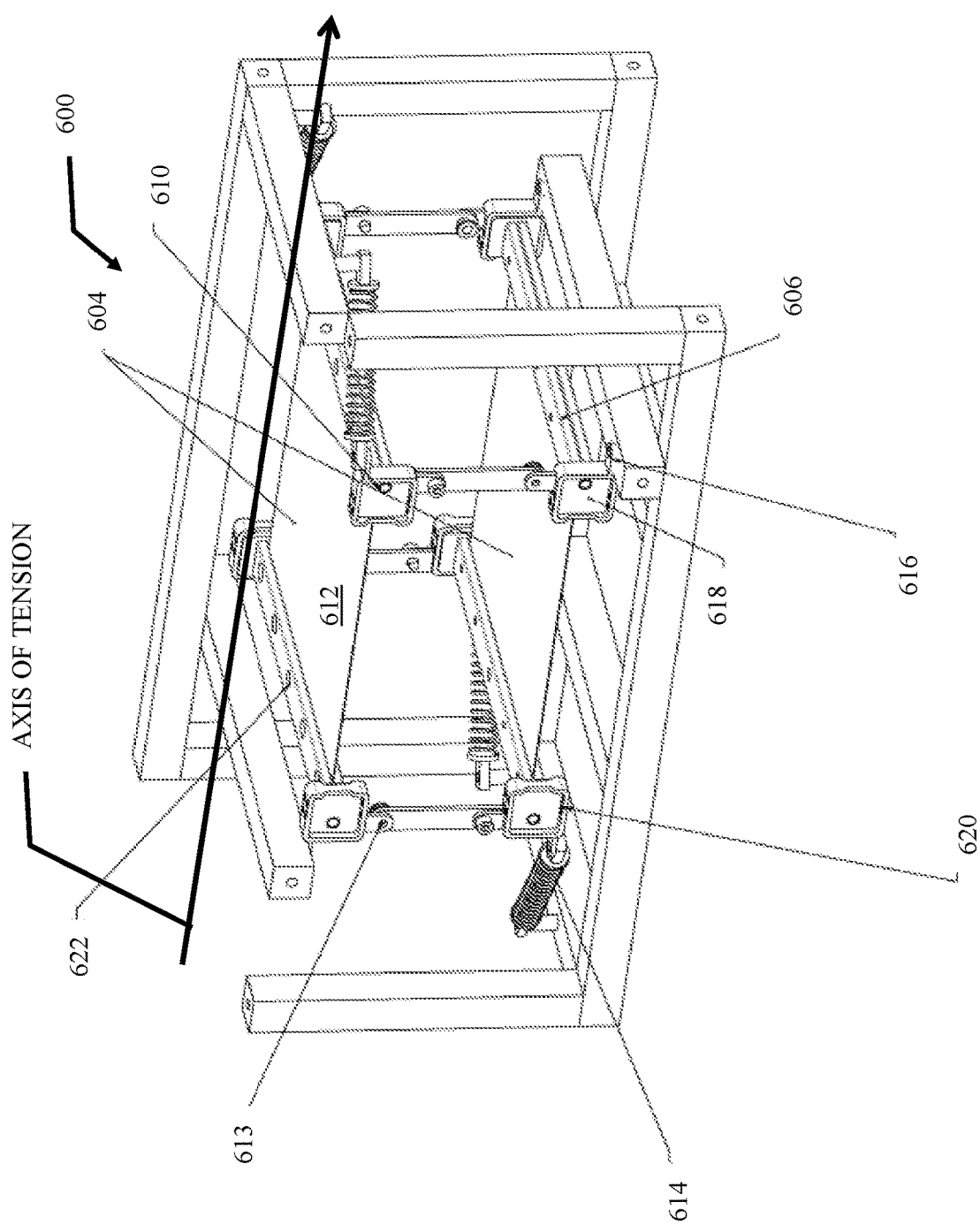
FIG. 6 illustrates a mesh heating element assembly according to exemplary embodiments.

FIG. 6 illustrates a mesh heating element assembly according to exemplary embodiments.

A mesh heating element assembly 600 may include a frame 602, a tensioner 614 and a wire mesh element 604 including a wire mesh 612, a conductor bar 606 to firmly hold an end of the wire mesh 612. In exemplary embodiments, the tensioner 614 can include a spring. At least one of the conductor bars 606 may be attached to a fixed support 616 on frame 602. The conductor bar 606 attached to the fixed support 616 may be linked or connected directly to a bus bar (not shown) for electrically connecting with a power supply (not shown). At least one of the conductor bar 606 may be attached to a pivoting mount point 613 disposed in the frame 602. The conductor bar 606 attached to the pivoting mount point 613 may be linked or connected by using a flexible conductor to the power supply (not shown). A ceramic mount 618 may provide electrical isolation of the conductor bar 606 from the frame 602. One end 620 of the wire mesh 612 held by the conductor bar 606 may swing or sway along an axis of tension so that the wire mesh 612 is kept tensioned. The conductor bar 606 can be connected or linked to a bus bar (not shown) on a solid mounted end, to a flexible conductor when the conductor bar is disposed to the movable side of mesh heating element assembly 600. In some embodiments, the conductor bar 606 can include a hole 622 to link or connect a power supply to the conductor bar 606 in order to energize the wire mesh 612.

For a planar shaped mesh heating element the tensioner may include one or more springs attached to a fixed support at one end and a pivoting independently suspended conductor bar affixed to one edge of the mesh heating element.

Figure 7:
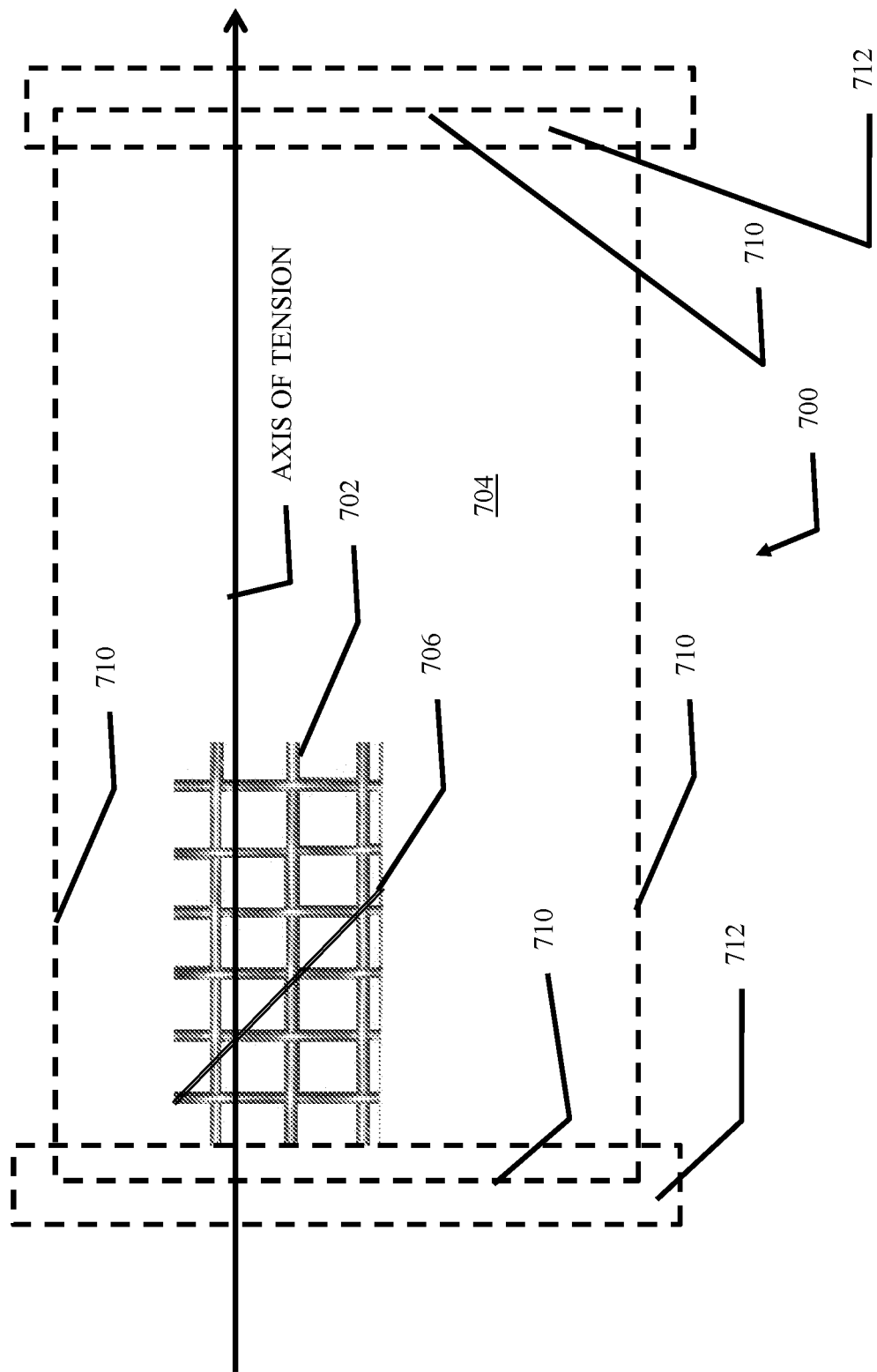
FIG. 7 illustrates a close-up of a mesh heating element where filaments of the mesh are aligned with an axis of tension, and a second filament in contact with the mesh intersecting the axis of tension at a non-orthogonal angle according to exemplary embodiments.

FIG. 7 illustrates a close-up of a mesh heating element 700 where filaments 702 of a mesh 704 are aligned with an axis of tension, and a second filament 706 in contact with the mesh 704 intersects the axis of tension at a non-orthogonal angle according to exemplary embodiments. One or more of the edges 710 of the mesh 704 may be held by a conductor bar 712.

Figure 8:
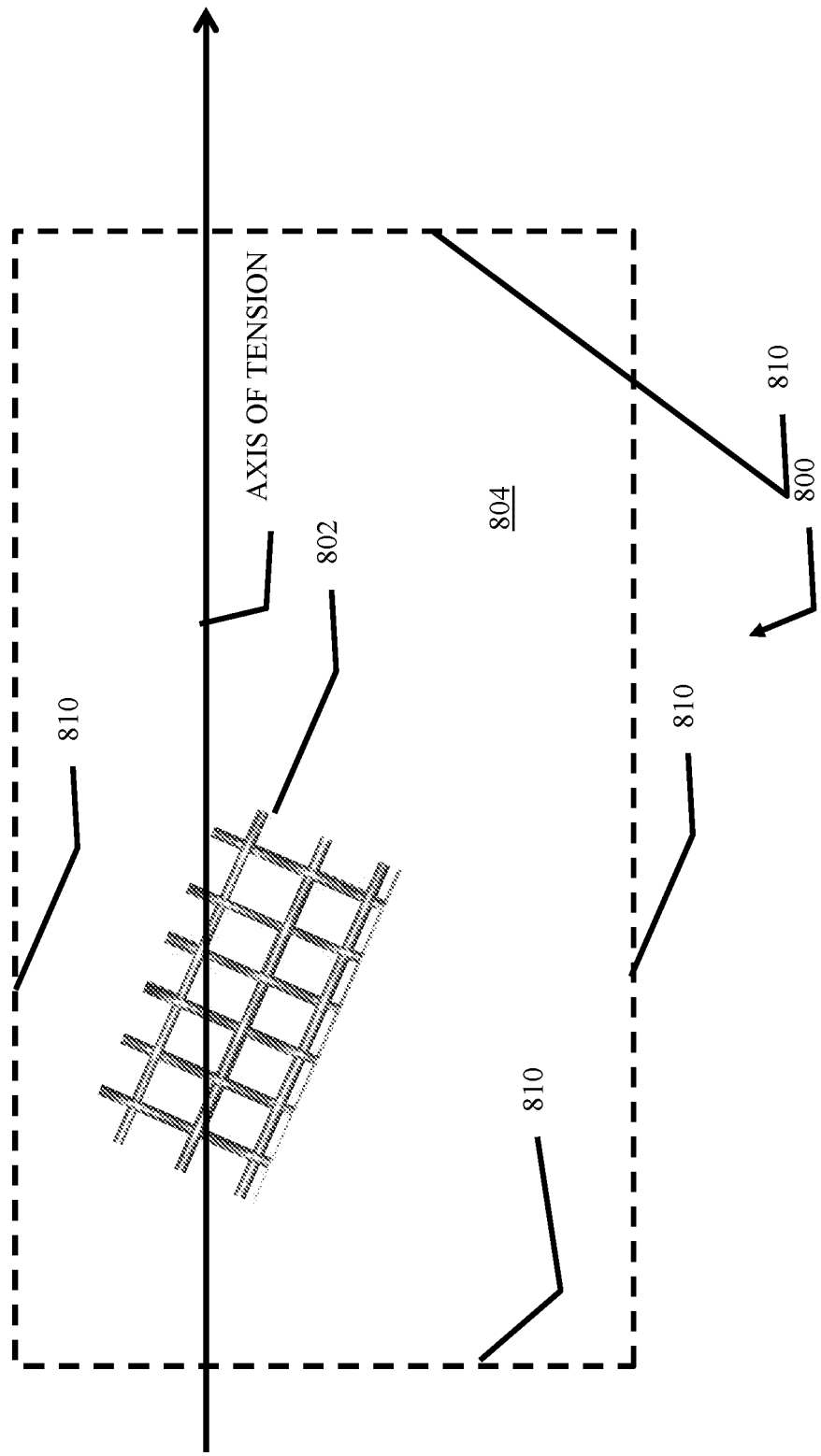
FIG. 8 illustrates a close-up of a mesh heating element where filaments of the mesh are offset from an axis of tension or intersecting the axis of tension at a non-orthogonal angle according to exemplary embodiments.

FIG. 8 illustrates a close-up of a mesh heating element 800 where filaments 802 of a mesh 804 are offset from an axis of tension or intersect the axis of tension at a non-orthogonal angle according to exemplary embodiments. The mesh 804 may include an edge 810.

Figure 9C:
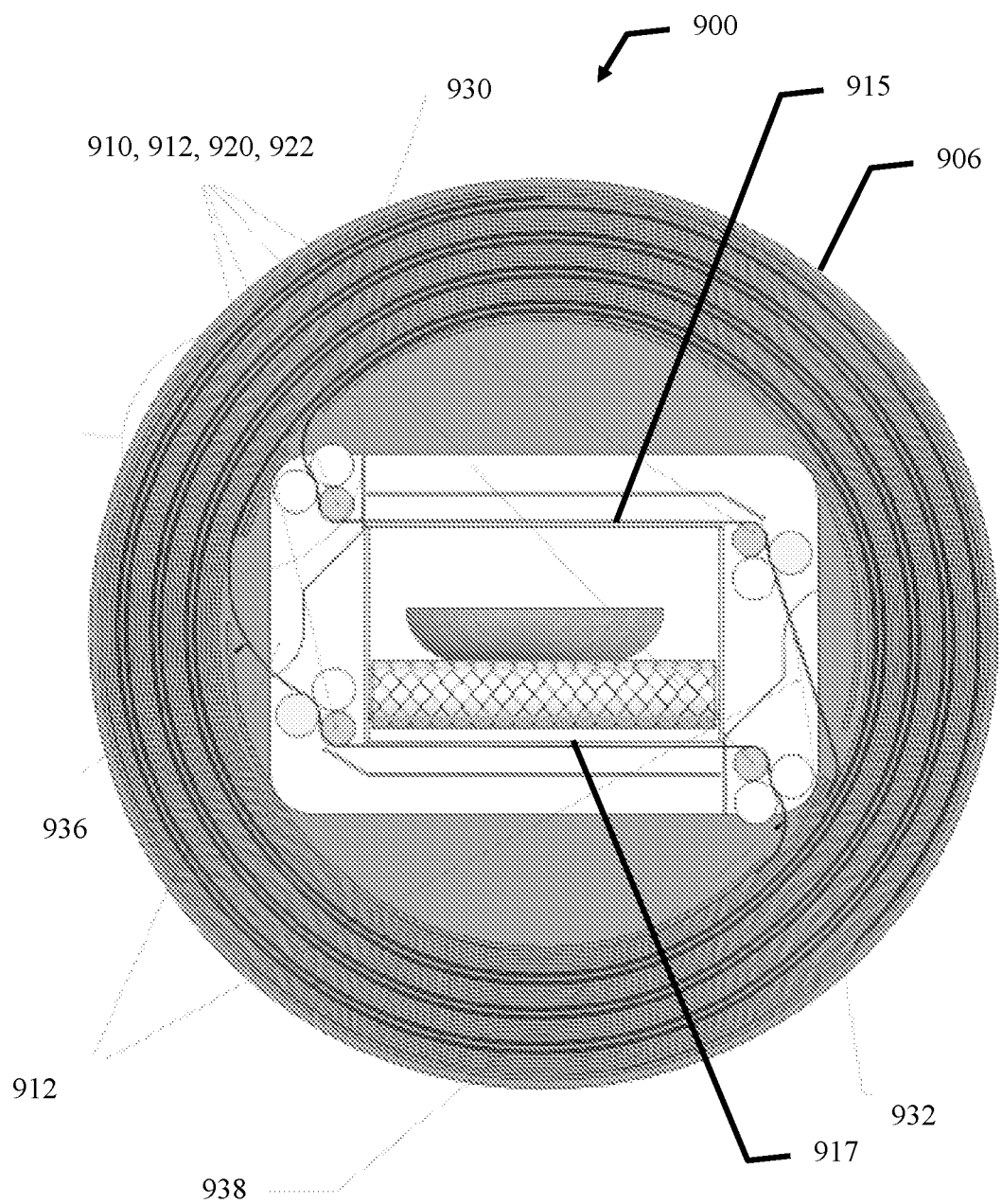
FIG. 9C illustrates a cross-section view of the continuous wire mesh heating system of FIG. 9A including a heat load conveyer, a top heating element and a bottom heating element supplied by and taken-up by a spiral wire mesh cartridge, according to exemplary embodiments.
Figure 9D:
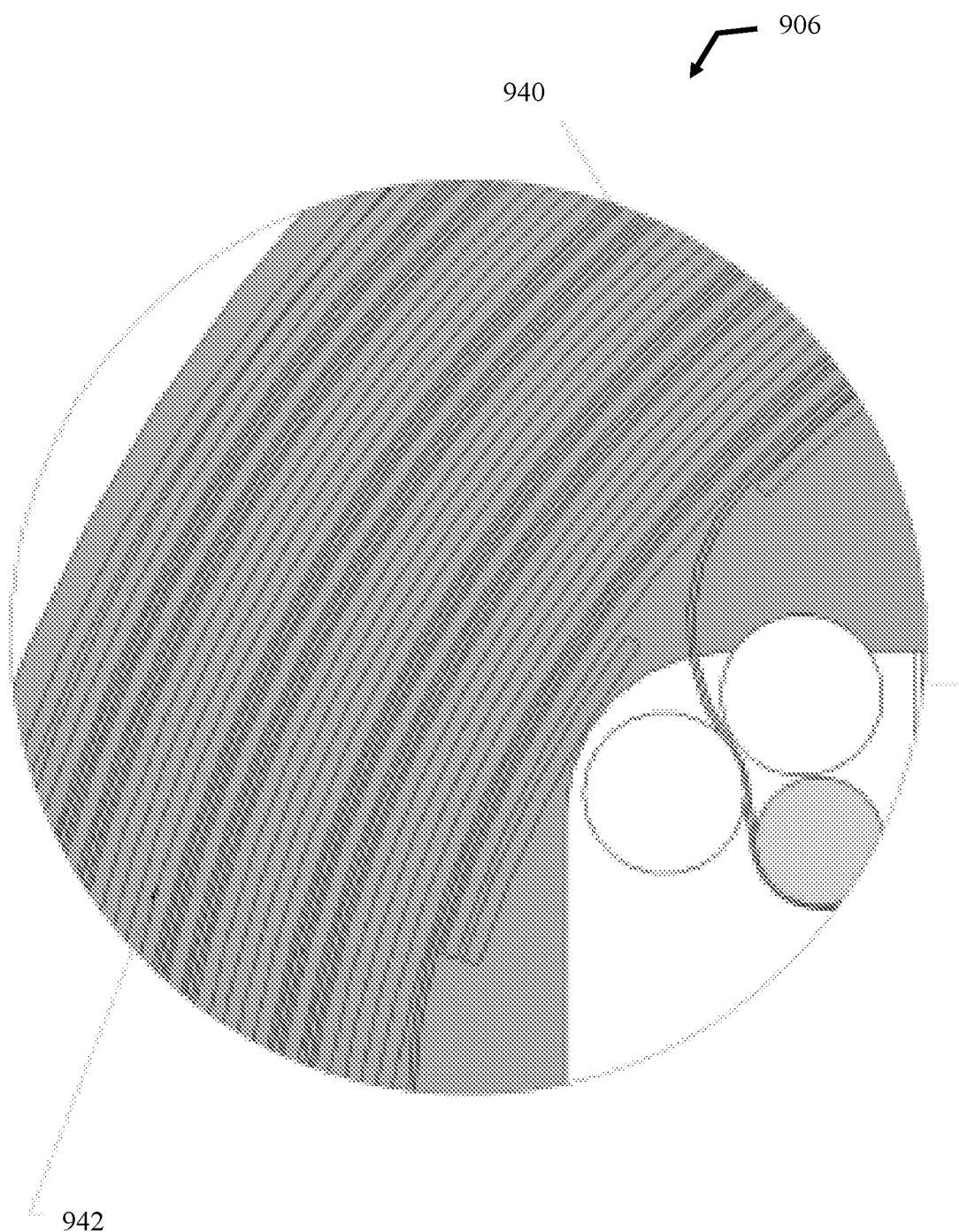
FIG. 9D illustrates an expanded view of the spiral wire mesh cartridge of FIG. 9B including an insulated channel to house an unused wire mesh interleaved with a used wire mesh, according to exemplary embodiments.
Figure 9G:
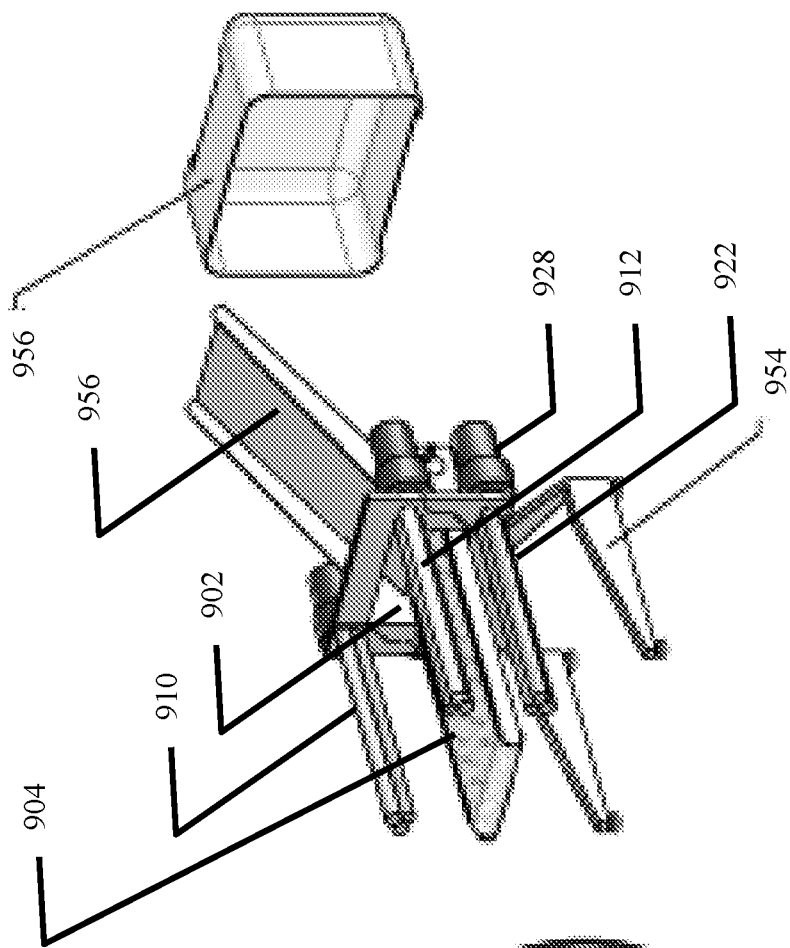
FIG. 9E, FIG. 9F and FIG. 9G illustrate an exploded view of the wire mesh heating system of FIG. 9A, according to exemplary embodiments.
Figure 9F:
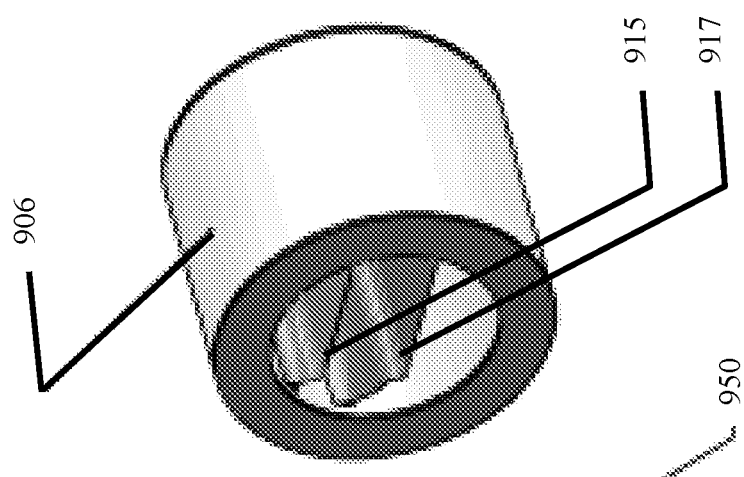
Figure 9E:
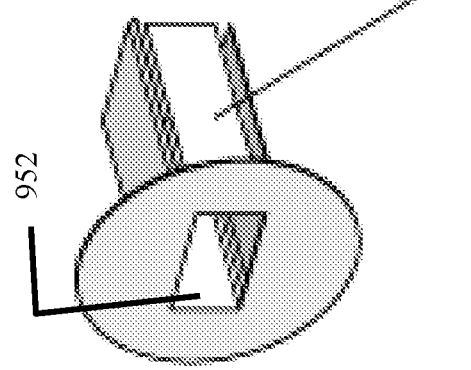

FIG. 9A illustrates a perspective view of a continuous wire mesh heating system according to exemplary embodiments. FIG. 9B illustrates a perspective view of a continuous wire mesh heating system of FIG. 9A without a cover, according to exemplary embodiments. FIG. 9C illustrates a cross-section view of the continuous wire mesh heating system of FIG. 9A including a heat load conveyer, a top heating element and a bottom heating element supplied by and taken-up by a spiral wire mesh cartridge, according to exemplary embodiments. FIG. 9D illustrates an expanded view of the spiral wire mesh cartridge of FIG. 9B including an insulated channels to house an unused wire mesh interleaved with a used wire mesh, according to exemplary embodiments. FIG. 9E, FIG. 9F and FIG. 9G illustrate an exploded view of the wire mesh heating system of FIG. 9A, according to exemplary embodiments.

A continuous wire mesh heating system 900 may include a food item or heat load intake 902 and a conveyer belt 904 to transport a heat load from the food item or heat load intake 902 to an output end 952 of the continuous wire mesh heating system 900. The continuous wire mesh heating system 900 may be provided with a wire mesh heating element using a cartridge 906, for example, a spiral wire mesh cartridge.

The continuous wire mesh heating system 900 may include a first continuous wire mesh heating element 914 energized by contacting a first electrode 910 and a second electrode 912. The first electrode 910 and the second electrode 912 may be made from metal, such as copper. A food item or heat load 908 may be transported by the conveyer belt 904. The continuous wire mesh heating system 900 may include a second continuous wire mesh heating element 916 energized by contacting a third electrode 920 and a fourth electrode 922. Each of the electrodes, the first electrode 910, the second electrode 912, the third electrode 920 and the fourth electrode 922 may be in contact with a respective set of driven wheels 924, 926. The wire mesh of the first/top continuous wire mesh heating element 914 and the second/bottom continuous wire mesh heating element 916 is woven through each of the electrodes and their respective set of driven wheels 924, 926. The woven wire mesh of the first continuous wire mesh heating element 914 and the second continuous wire mesh heating element 916 is kept tensioned by the driven wheels 924, 926 with a motor 928.

The wire mesh of the first/top continuous wire mesh heating element 914 exits the cartridge 906 at port 930, is woven through the first electrode 910 and its respective driven wheels, is woven through the second electrode 912 and its respective driven wheels, and reenters the cartridge 906 at port 932 as used wire mesh. The length of the wire mesh that extends between the first electrode 910 and the second electrode 912 forms a heat generating portion 915 of the first/top continuous wire mesh heating element 914.

The wire mesh of the second/bottom continuous wire mesh heating element 916 exits the cartridge 906 at port 936, is woven through the third electrode 920 and its respective driven wheels, is woven through the fourth electrode 922 and its respective driven wheels, and reenters the cartridge 906 at port 938 as used wire mesh. The length of the wire mesh that extends between the third electrode 920 and the fourth electrode 922 forms a heat generating portion 917 of the second/bottom continuous wire mesh heating element 916.

As illustrated in the expanded view of the cartridge 906, the cartridge 906 includes four parallel spirals 940 having four starts. In exemplary embodiments, the spirals 940 are formed from plastic and are approximately half (½) inches thick. The spirals 940 include one or more channels 942 that are insulated, for example, with Teflon coated fiberglass. The insulated channels 942 prevent shorting between the four spirals of wire mesh.

The continuous wire mesh heating system 900 may include a front cover 950, a chassis or frame 954 and a motor cover 956.

Figure 10:
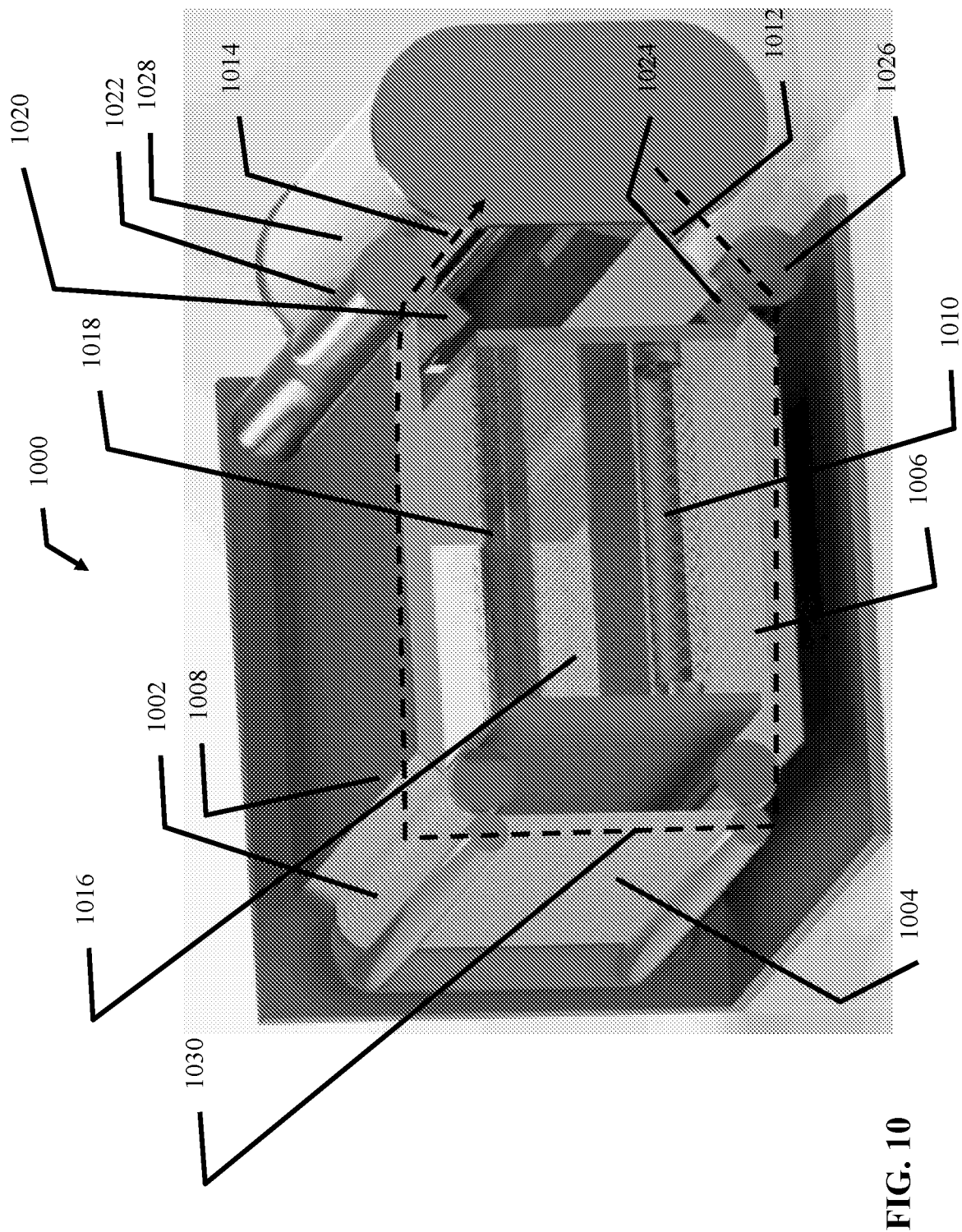
FIG. 10 illustrates a perspective view of a wire mesh heating system including a top wire mesh heating element, a side wire mesh heating element and a bottom wire mesh heating element, according to exemplary embodiments.

FIG. 10 illustrates a perspective view of a wire mesh heating system including a top wire mesh heating element, a side wire mesh heating element and a bottom wire mesh heating element, according to exemplary embodiments.

A wire mesh heating system 1000 may include a top wire mesh heating element 1002, a side wire mesh heating element 1004, a bottom wire mesh heating element 1006, a heat shield 1008, a conveyer belt 1010, a wire mesh supply roll 1012, a wire mesh take-up roll 1014, a heating cavity 1016, a tension spring 1018, a first electrode 1020, a first drive wheel 1022, a second electrode 1024, a second drive wheel 1026, and a cartridge 1028 to house the wire mesh supply roll 1012 and the wire mesh take-up roll 1014. A direction and path of travel of the wire mesh from the wire mesh supply roll 1012 to the wire mesh take-up roll 1014 is indicated by the dashed line 1030.

Figure 11:
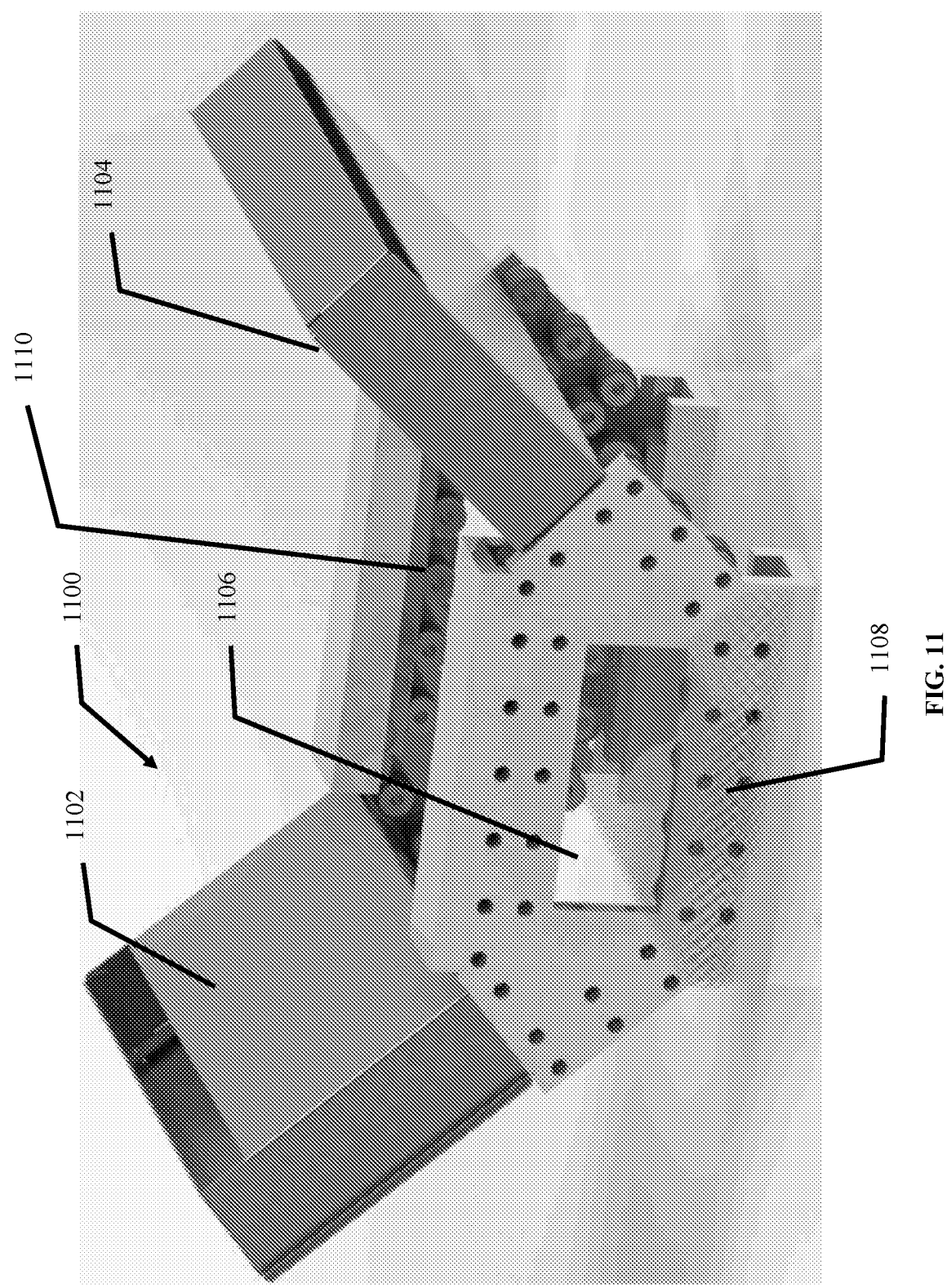
FIG. 11 illustrates a perspective view of a wire mesh heating system wherein a wire mesh supply is folded in a wire mesh supply cartridge according to exemplary embodiments.

FIG. 11 illustrates a perspective view of a wire mesh heating system wherein a wire mesh supply is folded in a wire mesh supply cartridge according to exemplary embodiments.

A wire mesh heating system 1100 includes a wire mesh supply that is folded in a wire mesh supply cartridge 1102. Wire mesh used by the wire mesh heating system 1100 can be collected by the wire mesh take-up cartridge 1104. The wire mesh heating system 1100 may include a heating cavity 1106, a conveyer belt 1108 and a plurality support wheels 1110.

The examples presented herein are intended to illustrate potential and specific implementations. It can be appreciated that the examples are intended primarily for purposes of illustration for those skilled in the art. The diagrams depicted herein are provided by way of example. There can be variations to these diagrams or the operations described herein without departing from the spirit of the invention. For instance, in certain cases, method steps or operations can be performed in differing order, or operations can be added, deleted or modified.

What is claimed is:

1. A mesh heating system comprising:
a mesh heating element comprising filaments;
two or more electrodes configured to supply a current to the mesh heating element disposed between the two or more electrodes; and
a tensioner to maintain the mesh heating element at tension along an axis of tension as the mesh heating element is heated,
wherein some of the filaments of the mesh heating element are disposed to intersect the axis of tension at a non-orthogonal angle.

2. The mesh heating system of claim 1, wherein the filaments of the mesh heating element form a square mesh wherein the filaments are offset from the axis of tension.

3. The mesh heating system of claim 1, wherein the filaments of the mesh heating element form a square mesh wherein some of the filaments are disposed parallel to the axis of tension and the remaining filaments are disposed orthogonal to the axis of tension, and the mesh heating element further comprises a second filament disposed to intersect the filaments.

4. The mesh heating system of claim 1, wherein the filaments of the mesh heating element form a non-square mesh wherein some of the filaments are disposed parallel to each other, and the remaining filaments are parallel to each other and disposed at a non-orthogonal angle with respect to the some of the filaments.

5. The mesh heating system of claim 1, wherein the filaments of the mesh heating element form a square mesh wherein the filaments are offset from the axis of tension.

6. The mesh heating system of claim 1, further comprising a power supply comprising a battery, a charger to charge the battery, and a relay electrically connected between the battery and the two or more electrodes.

7. The mesh heating system of claim 1, further comprising a housing to contain the mesh heating element, the tensioner and the two or more electrodes.

8. The mesh heating system of claim 1, further comprising a heating load delivery system to convey a heating load along a surface of the mesh heating element.

9. The mesh heating system of claim 1, further comprising:
a fixed mount to support a first edge of the mesh heating element; and
a pivoting mount to support a second edge of the mesh heating element, wherein the first edge is disposed opposite the second edge,
wherein the tensioner is connected to the pivoting mount.

10. The mesh heating system of claim 1, wherein the tension comprises a spring.

11. The mesh heating system of claim 1, further comprising a conductor bar disposed on an edge of the mesh heating element, wherein one or more of the two or more electrodes is directly linked to the conductor bar.

12. The mesh heating system of claim 1, further comprising:
a mesh heating element supply roll;
a mesh heating element take-up roll; and
a stepper to pull the mesh element from the mesh heating element supply roll to the mesh heating element take-up roll,
wherein the mesh heating element comprises a continuous mesh heating element disposed about the mesh heating element supply roll.

13. A mesh heating system comprising:
a mesh heating element supply roll comprising a continuous mesh heating element disposed about the mesh heating element supply roll;
a mesh heating element take-up roll; and
a pre-tensioned spring disposed with the mesh take-up roll,
wherein a portion of the continuous mesh heating element comprises a mesh heating element and
wherein one or more of the two or more electrodes comprises a contact roller in direct contact with the mesh heating element, and a brush block to electrically connect the contact roller with a power supply.

14. The mesh heating system of claim 1, further comprising a stepper to pull the mesh element from the mesh heating element supply roll to the mesh heating element take-up roll.

15. The mesh heating system of claim 14, wherein the stepper comprises a motor.

16. The mesh heating system of claim 15, wherein the motor directly provides tension to the continuous mesh heating element.

17. The mesh heating system of claim 14, further comprising a controller to index the stepper to advance the continuous mesh heating element based on a count of heating cycles.

18. The mesh heating system of claim 1, further comprising:
   two or more electrodes configured to supply a current to the mesh heating element disposed between the two or more electrodes; and
   a tensioner to maintain the mesh heating element at tension along an axis of tension as the mesh heating element is heated.

\* \* \* \* \*